Feb. 24, 1953          G. COZZO          2,629,640

BEARING

Filed July 8, 1950

INVENTOR.
GIUSEPPE COZZO
BY
Pollard and Johnston
ATTORNEYS

Patented Feb. 24, 1953

2,629,640

UNITED STATES PATENT OFFICE 2,629,640

BEARING

Giuseppe Cozzo, Yonkers, N. Y., assignor to Hydropress, Incorporated, New York, N. Y., a corporation of Delaware Application July 8, 1950, Serial No. 172,753

7 Claims. (Cl. 308—76)

1

The present invention relates to shaft bearings of the oil film type, and particularly to shaft bearings of the oil film type wherein oil is supplied to the bearings under pressure for lubricating and cooling the journal rotating therein.

The primary object of this invention is to obtain improved cooling and lubrication in heavily loaded shaft bearings, for example those in which rolling mills are journalled.

According to features of this invention, the lubricating and cooling oil supplied to the bearing is circulated in the latter over the non-loaded portion of the journal in a direction counter to the direction of rotation of the supported journal so that counterflow heat transmission between the journal and the oil is obtained. As is well known, counterflow heat transmission tends to result in a higher final temperature of the fluid being heated, in this case the oil, and therefore the heat absorbed from the journal is greater and the cooling thereof increased. Since the oil tends to adhere to the journal surface and the heat transfer between the journal and an adhering oil film decreases sharply as the temperature of the film approaches that of the journal, the adhering oil is scraped from the journal at a plurality of circumferentially spaced areas on the latter's surface so that the heated oil film is removed and replaced with cool oil several times during each rotation of the journal to thereby maintain the heat transfer at a uniformly high rate for effecting improved cooling of the journal. Finally, the oil supply to the bearing is arranged so that the oil film interposed between the bearing surfaces is always drawn from the point at which cool oil enters the bearing to thereby maintain the viscosity of the oil film for withstanding high bearing pressures without breaking down.

Accordingly, a specific object of this invention is to provide heavily loaded shaft bearings supplied with oil under pressure for lubricating and cooling the journal therein, wherein the oil is circulated over the non-loaded portion of the journal in a direction counter to the rotation thereof to obtain counterflow transmission of heat from the journal to the oil.

Another specific object is to provide bearings of the described class, wherein the oil film is removed from the non-loaded portion of the journal surface at a plurality of circumferentially

2 spaced areas so that the oil film on such non-loaded portion of the surface is removed several times during each rotation of the journal and replaced with cool oil to thereby maintain the rate of heat transmission at a uniformly high level.

Still another specific object is to provide bearings of the oil film type having the characteristics and advantages previously recited, wherein the oil forming the film between the bearing surfaces is continuously drawn from a source of cool oil so that the viscosity of such film is maintained for withstanding high bearing loads.

Finally, an object of this invention is to provide a shaft bearing of the oil film type having improved lubricating and cooling characteristics even when subjected to high bearing load, and which is simple in construction, sturdy and inexpensive to manufacture.

These and other objects, features and advantages of this invention will appear in the following detailed description of an illustrative embodiment thereof read in connection with the accompanying drawing wherein.

Figure 2:
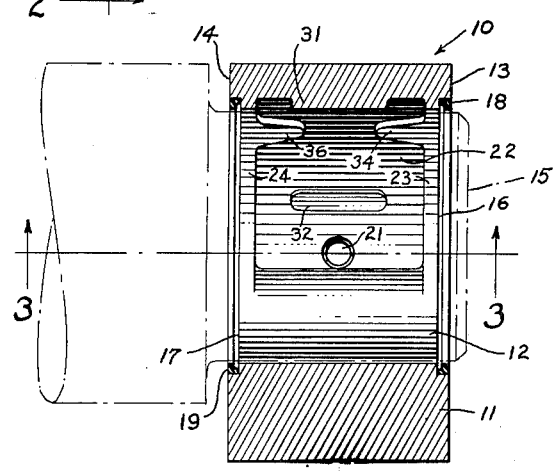
Fig. 2 is an axial, vertical sectional view of the bearing taken along line 2—2 of Fig. 1, and with the journal shown in broken lines to reveal the formation of the surface of the bearing.

Referring to the drawing, a bearing 10, illustrating an embodiment of this invention, is shown to include a body 11 of rectangular form, although the proportions and shape or form of body 11 may be round or may be varied to accommodate various load and mounting conditions. A cylindrical bore 12 extends through body 11 and opens at the opposite faces 13 and 14 of the latter. Bore 12 is formed with a diameter slightly greater than the diameter of the journal 15, shown in broken lines in Figs. 2 and 3, which it is adapted to rotatably receive so that some clearance is provided between the journal and the surface of the bore within which an oil film may form for supporting the bearing loads. Each of the opposite ends of bore 12 is counterbored, as at 16 and 17, to provide annular seats within which sealing rings 18 and 19, formed of rubber or other suitable material, respectively fit and closely engage around journal 15 to prevent excessive leakage of oil through the opposite ends of bore 12. The counterbore 16 and sealing ring 18 may be omitted and a suitable cover (not shown) provided for sealing the open end of the bearing.

Figure 1:
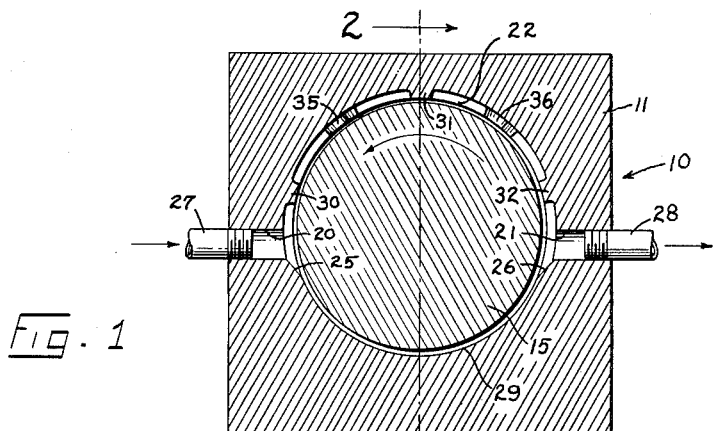
Fig. 1 is a vertical sectional view through the center of a bearing constructed according to this invention, and in a plane at right angles to the axis of rotation of a journal supported therein.

Axially aligned passages 20 and 21 are formed in the sides of body 11 and open at their inner ends into bore 12 below the center of the latter to constitute an inlet and outlet, respectively, for the oil supplied to the bearing. It is apparent that more than one inlet and outlet aperture can be provided if desired. A groove 22 is formed in the non-loaded portion of the surface of bore 12 and extends circumferentially from below the inner open end of inlet passage 21 so that the inlet and outlet passages 20 and 21, respectively, communicate with the opposite ends of groove 22. The sides of groove 22 are spaced axially inward from the counterbored seats 16 and 17 of the sealing rings or glands to thereby define rims or ridges 23 and 24 isolating the groove from seats 16 and 17. The opposite ends of groove 22 are tapered or sloped into the contour of bore 12 as at 25 and 26 (Fig. 1) to provide wedge shaped spaces between the journal and the end portions of the groove for assisting in the formation of an oil film between the bearings surfaces in a manner hereinafter specifically described.

A conduit or pipe 27, carrying a supply of oil, or other suitable lubricant and coolant, under pressure from a source (not shown) opens into inlet passage 20 and an outlet or discharge conduit or pipe 28 is secured in outlet passage 21 to carry the oil out of the bearing. Journal 15 rotates in the direction of the arrow on Fig. 1 so that the non-loaded, or upper, portion thereof moves in a direction counter to the flow of oil from inlet 20, through groove 22 and over the non-loaded portion of the journal for exit at outlet 21. Since the oil flowing through groove 22 and the non-loaded surface of the journal move in opposite directions, counterflow heat transmission from the journal to the oil flowing in the groove is obtained. The surface of the journal is heated during its contact with the bearing surface 29 and the journal surface is hottest as it leaves bearing surface 29 just below outlet passage 21. The oil entering through passage 20 is coolest at that point, and absorbs heat from the journal during its flow under pressure through groove 22 to outlet passage 21. Therefore, the oil and journal surface are hottest in the area of outlet passage 21 and coolest in the area of inlet passage 20 so that a substantial temperature differential exists between the oil and journal throughout the area of heat transmission to thereby maintain heat transmission at a uniformly high level for maximum cooling of the journal.

While most of the oil entering the bearing under pressure through inlet passage 20 flows to the outlet passage by way of groove 22, some of the cool entering oil is carried by the surface of the journal in the opposite direction into the wedge shaped space defined by the tapered end 25 of the groove and the surface of the journal, and the gradually diminishing clearance produces wedges or films of oil between the bearing surface 29 of bore 12 and the loaded surface of the journal which can withstand heavy pressures without being broken or forced out. It will be noted that the oil carried by the journal surface to form the load supporting oil film is drawn from the cool entering oil so that the viscosity of this oil film is maintained at a value capable of withstanding the heavy pressures. When the oil film is formed of heated oil, having reduced viscosity, the tendency of the film to break under heavy bearing loads is increased. Therefore, the arrangement set forth above provides counterflow heat transmission between the journal and the oil flowing through groove 22 for increasing the cooling of the journal, and also provides for the formation of oil films to support the journal on the bearing surface, which oil films are formed of cool oil to increase their ability to withstand heavy bearing loads.

Although counterflow heat transmission between the oil flowing in groove 22 and the non-loaded surface of the journal potentially can provide the optimum efficiency in cooling the journal, it has been found that this potential is not normally realized because of the tendency of the oil layer immediately adjacent to the journal to adhere to the latter. When an oil layer adheres to the journal surface, that relatively thin layer of oil is heated by the journal to a temperature close to that of the journal so that further heat transfer from the journal to the adhering oil layer is at a reduced rate. The outer layers of oil do not come in direct contact with the journal surface and their full capacity for absorbing heat rapidly is not utilized. To correct this deficiency, the heated oil layer adhering to the non-loaded surface of the journal is removed therefrom at circumferentially spaced areas and cooler oil then contacts the scraped surface so that the oil film adhering to the non-loaded surface of the journal is changed several times during each rotation of the journal to provide improved cooling of the journal.

Figure 3:
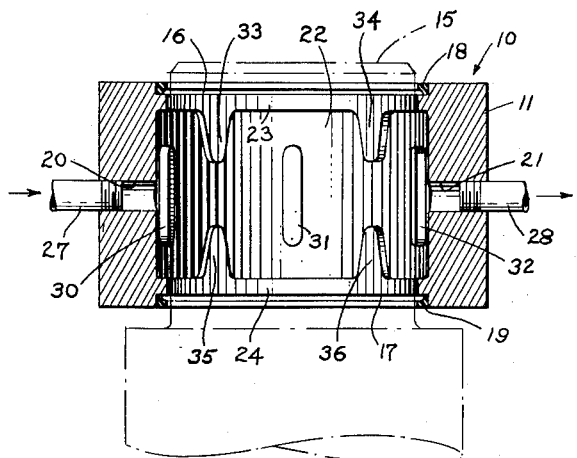
Fig. 3 is a horizontal sectional view of the bearing taken along line 3—3 of Fig. 2, and with the journal shown in broken lines.

In the illustrated embodiment, the groove 22 is formed with three transversely elongated, circumferentially spaced apart raised or relieved portions forming oil scrapers or deviators 30, 31 and 32. The opposite ends of scrapers 30, 31 and 32 are spaced from rims 23 and 24, defining the sides of groove 22, so that the oil flows around the opposite ends of the deviators. Rims 23 and 24 are formed with lateral tapering projections 33 and 34, and 35 and 36, respectively, extending into groove 22 between relieved portions or deviators 30, 31 and 32 (Fig. 3). Projections 33 and 34 are transversely aligned with projections 35 and 36, respectively, and the ends of the aligned projections are spaced apart distances less than the lengths of deviators 30, 31 and 32. The raised surfaces of the lateral projections and of the scrapers or deviators are continuations of bore 12 and are formed to engage the non-loaded surface of the rotating journal to scrape the adhering oil film from the surface for the purpose set forth above. Tracing the flow of oil through groove 22, the oil enters centrally of the groove at inlet 20 and is diverted outwardly towards the sides by deviator 30; tapered projections 33 and 35 then cause the oil flow to be diverted inwardly toward the center of the groove; and similar lateral changes in the flow path are successively effected by deviator 31, projections 34 and 36, and deviator 32 until the oil exits centrally through outlet 21. It will be seen that deviators 30, 31 and 32 scrape the central portion of the journal surface while projections 33 and 34 and projections 35 and 36 scrape the opposite side portions thereof.

To promote the understanding of the manner in which the deviators and projections scrape the hot oil film from the surface and replace it with relatively cool oil, particular reference will be had to the action of deviator 31 and projections 33 and 35. As previously indicated, deviator 31 scrapes the central portion of the surface and projections 33 and 35 divert the oil flow towards the center of the groove. Therefore, immediately after a portion of the journal surface is scraped by deviator 31, it advances to a position to which relatively cool oil has been diverted by projections 33 and 35. Although the action of only deviator 31 and projections 33 and 35 has been detailed, it is apparent that the remaining deviators and projections cooperate in a similar manner so that the oil film is removed and replaced several times during each rotation of the journal and thus there are no dead spots where the oil can become too hot.

Having thus described a preferred embodiment of this invention, it is to be understood that changes and modifications, obvious to those skilled in the art, may be effected without departing from the scope of the invention which is intended to be defined in the appended claims.

What I claim is:

1. A bearing comprising a body formed with a bore for rotatably receiving a journal therein, a centrally arranged, circumferentially extending groove opening into the surface of said bore in its non-loaded portion, means supplying oil under pressure to said groove for flow through the latter in a direction counter to the direction of movement of the journal, and restricted area scraping and oil diverting means in said groove engageable with the non-loaded surface of the journal at circumferentially spaced areas scraping the hot oil film from portions of the journal and diverting it away therefrom, so that said film will be replaced by another film from the counterflowing oil.

2. A bearing comprising a body formed with a bore for rotatably receiving a journal therein, a centrally arranged, circumferentially extending groove opening into the non-loaded portion of the surface of said bore, an inlet passage opening into said groove adjacent one end of the latter, an outlet passage extending from the other end of the groove, at least said one end of the groove sloping gradually into the surface of said bore to define a wedge shaped space with the surface of the journal, means supplying oil under pressure to said inlet passage for flow through said groove to said outlet passage in a direction counter to the direction of rotation of the journal to thereby obtain counterflow heat transmission from the journal to the oil in said groove and for adherence to the surface of the journal in said wedge shaped space to form a load supporting oil film between the loaded surfaces of said bore and the journal, and a plurality of spaced journal scraping and oil diverting means in said groove having surfaces directing the scraped oil film generally in an axial direction relative to said journal, said means being engageable with the non-loaded surface of the journal at circumferentially spaced areas thereof for scraping off the adhering oil film, the counterflow oil replacing the oil on the scraped surface with fresh oil so as to prevent hot areas forming on the journal.

3. A bearing comprising a body formed with a bore for rotatably receiving a journal therein, a centrally arranged, circumferentially extending groove opening into the non-loaded portion of the surface of said bore, means supplying oil under pressure to said groove for flow through the latter in a direction counter to the rotation of the journal, and laterally staggered, circumferentially spaced, relieved members in said groove for scraping the surface of the journal as the latter rotates and for laterally diverting the oil flow through said groove, at spaced intervals, into contact with scraped portions of the journal surface.

4. A bearing comprising a body formed with a bore for rotatably receiving a journal therein, a centrally arranged, circumferentially extending groove opening into the non-loaded portion of the surface of said bore, means supplying oil under pressure to said groove for flow through the latter in a direction counter to the rotation of the journal, and laterally staggered, circumferentially spaced, relieved members in said groove having raised surfaces coincident with the surface of said bore for scraping the surface of the journal as the latter rotates and for diverting the flow of oil through said groove into contact with the scraped portions of the journal surface.

5. A bearing comprising a body formed with a bore for rotatably receiving a journal therein, a centrally arranged, circumferentially extending groove opening into the non-loaded portion of the surface of said bore, means supplying oil under pressure to said groove for flow through the latter in a direction counter to the rotation of the journal, several transversely extending, circumferentially spaced, relieved members in said groove having their ends spaced from the side edges of the latter, and relieved projections extending laterally from the side edges of the groove towards the center of the latter between said relieved members, the raised surfaces of said relieved members and projections being coincident with the surface of the bore for scraping engagement with the surface of the journal at spaced positions whereby said relieved members and projections divert the oil flow through said groove for contact with the scraped areas of the journal surface.

6. In combination, a bearing including a body formed with a bore, a journal rotatable in said bore, a centrally arranged, circumferentially extending groove opening into the non-loaded portion of the surface of said bore, means supplying oil under pressure to said groove for flow through the latter in a direction counter to the rotation of said journal to provide counterflow heat transmission from said journal to the oil flowing in said groove, and laterally staggered, circumferentially spaced relieved portions in said groove engaging the surface of said journal for scraping the oil film from the latter several times during each rotation thereof and laterally diverting the oil flow in said groove for contact with the scraped portions of the surface of said journal.

7. In combination, a bearing including a body formed with a bore, a journal rotatable in said bore, a centrally arranged, circumferentially extending groove opening into the non-loaded portion of the surface of said bore, an inlet passage opening into one end of said groove, an outlet passage extending from the other end of said groove, at least said one end of said groove sloping into the surface of said bore to define a wedge shaped space with the surface of said journal, means supplying oil under pressure to said inlet passage for flow through said groove to said outlet passage in a direction counter to the rotation of said journal to provide counterflow heat transmission from said journal to the oil flowing in said groove and for adherence to the surface of said journal at said wedge shaped space to provide an oil film between the loaded portions of the surfaces of said bore and journal, and laterally staggered, circumferentially spaced relieved portions in said groove engaging the surface of said journal for scraping the oil film therefrom and laterally diverting the oil flow through said groove for contact with the scraped portions of the surface of said journal.

GIUSEPPE COZZO.

REFERENCES CITED

The following references are of record in the file of this patent:

UNITED STATES PATENTS

| Number | Name | Date |
|---|---|---|
| 1,442,477 | Johnson | Jan. 16, 1923 |

FOREIGN PATENTS

| Number | Country | Date |
|---|---|---|
| 297,623 | Great Britain | Sept. 27, 1928 |
| 339,161 | Germany | July 18, 1921 |